United States Patent [19]

Davis

[11] Patent Number: 4,617,822

[45] Date of Patent: Oct. 21, 1986

[54] TELL-TALE WEAR MONITOR FOR PIPES HAVING WEAR RESISTANT INNER LININGS

[75] Inventor: Thomas E. Davis, Anderson, Ind.

[73] Assignee: Cerline Ceramic Corporation, Anderson, Ind.

[21] Appl. No.: 767,520

[22] Filed: Aug. 20, 1985

[51] Int. Cl.⁴ .............................................. F16L 55/00
[52] U.S. Cl. .................................... 73/40.5 R; 138/36
[58] Field of Search .......................... 73/86, 7, 40.5 R; 138/36; 340/605

[56] References Cited

U.S. PATENT DOCUMENTS

| | | | |
|---|---|---|---|
| 1,211,500 | 1/1917 | Strong | 138/96 |
| 1,313,627 | 8/1919 | Flannery et al. | 411/381 |
| 1,426,956 | 8/1922 | Case | 138/36 |
| 1,913,564 | 6/1933 | Raymond | 138/36 |
| 1,938,475 | 12/1933 | Alexander | 138/36 |
| 1,962,168 | 6/1934 | Andrus | 340/605 |
| 1,975,832 | 10/1934 | De Florez | 138/36 |
| 1,977,177 | 10/1934 | De Florez | 138/36 |
| 2,110,079 | 3/1938 | Butler | 138/36 |
| 4,119,123 | 10/1978 | Samuels | 138/122 |

Primary Examiner—Stewart J. Levy
Assistant Examiner—Robert R. Reavis
Attorney, Agent, or Firm—Woodard, Weikart, Emhardt & Naughton

[57] ABSTRACT

A tell-tale wear monitor for pipes having wear resistant inner linings. A plurality of wear monitors is provided spaced apart along the length of a pipe section or spool and angularly spaced apart about the pipe circumference. Each of the wear monitors includes a plug member attached to the outer pipe casing and covering a tell-tale hole which extends through the pipe casing. The plug members are made of a material which, relative to the inner lining material, is readily worn away by abrasive contact with the material conveyed within the pipe. When the plug member is worn through, fluid flow is permitted through the tell-tale hole. The wear monitor provides a means for determining when maintenance of the pipe section should be scheduled and allows for extended useful life of the pipe section.

18 Claims, 9 Drawing Figures

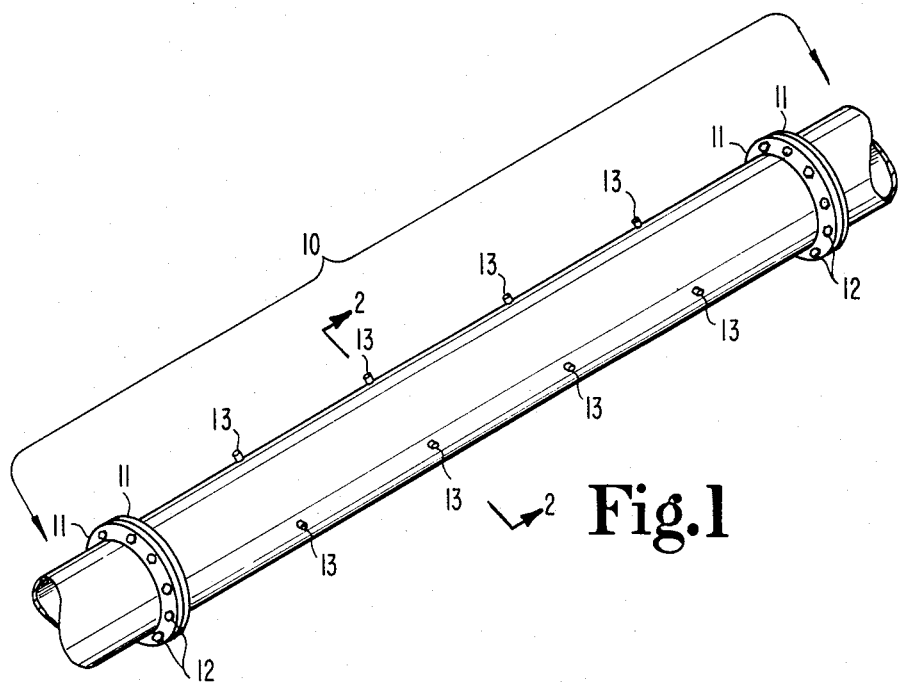
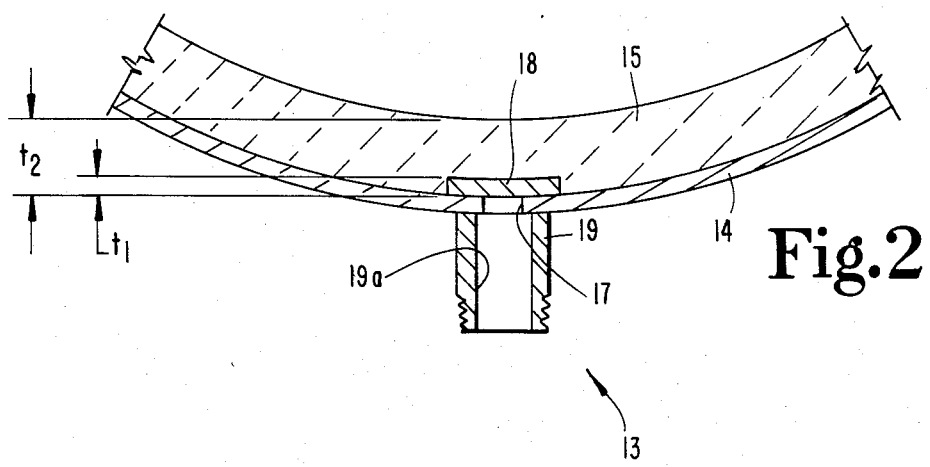

TELL-TALE WEAR MONITOR FOR PIPES HAVING WEAR RESISTANT INNER LININGS

BACKGROUND OF THE INVENTION

The subject invention relates generally to the field of bulk material pipe systems adapted to convey highly abrasive materials from one location to another by liquid, pneumatic and vacuum movement and, more particularly, to pipes for such systems having highly wear resistant inner linings.

In many types of industrial and commercial operations, highly abrasive materials such as coal, coke, ore, ash, sand and grain are transported in bulk from one location to another through pipeline systems by fluid movement of the material. Depending upon the precise application, the material may be transported pneumatically or in a slurry through the pipeline system. Because materials such as those listed above are highly abrasive, the pipe sections through which the materials are transported are subject to a high degree of wear. In fact, one of the present major causes of breakdowns in such piping systems is due to wearing away of a portion of the pipe from such abrasive contact. Even hardened or stainless steel pipe casings can be abraded away in a matter of a few months when subjected to the sliding contact of abrasive materials conveyed therethrough.

Since bulk material handling systems of the type described above are a vital link in the operation of many heavy industrial plants, power generating companies, etc., it is of great importance to keep such systems operable for a maximum portion of time. In the past, this has been accomplished by using pipe sections having highly wear resistant inner linings, such as ceramic, at least along those sections of the pipe system for which high wear is reasonably anticipated. Depending upon the material construction for the inner lining, pipe sections having wear resistant inner linings can last several and even many times longer than pipe sections having standard steel or even hardened or stainless steel casings.

While pipe sections of the type just described have a much longer life than previous pipe sections formed of hardened or stainless steel, they will still eventually wear away in the same manner as other pipe sections, causing an unscheduled breakdown of the system. Presently, there are two basic ways to determine when a pipe section is about to wear through. The first way is by a visual inspection which necessitates a production shutdown and dismantling of the piping system for inspection purposes. Such scheduled inspections, in theory, provide a benefit in that the plant operators can plan ahead for a plant shutdown. Further, as long as a pipe section is only partially worn through, the pipe section can be rotated on its center axis to move the highly worn area of the pipe away from the area which is subject to increased wear. This practice saves the pipe section from having to be discarded long before the remainder of the pipe has lost its usefulness.

Unfortunately, it is very difficult, if not impossible, to predict where, along the length of a pipe system, abrasive contact wil be most highly concentrated and how quickly a wear through condition will occur. Thus, scheduled inspections are very costly and time consuming, especially in remote or difficult to reach areas. Further, unscheduled breakdowns can occur even when a piping system is periodically inspected. Because of these factors, performing visual inspections at periodic times is only marginally effective, and for this reason not often performed. The second and most common practice is to simply allow the various sections of the pipe system to gradually wear through and then replace such sections accordingly. This results in an unscheduled breakdown of the bulk material handling system, not to mention a substantial spillage of material. Depending upon the production schedule of the plant, either a plant shutdown is effected or other temporary remedial action is taken until such time as the worn section can be more conveniently scheduled for replacement.

SUMMARY OF THE INVENTION

A pipe section adapted to convey highly abrasive materials from one location to another according to one embodiment of the present invention comprises an outer casing and an inner lining made of a material which, relative to the outer casing, is more resistant to wear from abrasive contact with the material conveyed within the pipe section. The invention is further characterized by having the outer casing defiing a hole therethrough extending between the inner lining and the exterior of the outer casing. There is further provided a plug member located between the inner lining and outer casing and covering the hole. The inner lining has a thickness which is reduced in the area of the hole by the plug member. The plug member is characterized by being made of a material which, relative to the inner lining, is readily worn away by abrasive contact with the material conveyed within the pipe section. Thus, when the plug member is worn through, fluid flow is permitted through the hole so as to serve as a signal that maintenance of the pipe section should be scheduled.

Accordingly, it is an object of the present invention to provide an improved pipe section for conveying highly abrasive materials.

It is a further object of the present invention to provide a pipe section with an inner lining wear monitor means for determining when maintenance of the pipe section should be scheduled.

It is a yet further object of the present invention to provide a pipe section having a wear monitor means which maximizes the wear life of the pipe section by providing a signal prior to when the inner lining has been fully worn through.

Another object of the present invention is to provide a pipe section having a wear monitor with the above advantages, yet which is very inexpensive and simple construction which requires no precision parts or operations.

Related objects and advantages of the present invention will become more apparent by reference to the following figures and detailed description.

BRIEF DESCRIPTION OF THE DRAWINGS

FIG. 1 is a fragmentary perspective view showing a straight pipe section of a bulk material handling system embodying the wear monitor apparatus of the present invention.

FIG. 2 is fragmentary cross section view taken along lines 2—2 in FIG. 1.

DESCRIPTION OF THE PREFERRED EMBODIMENT

Figure 3:
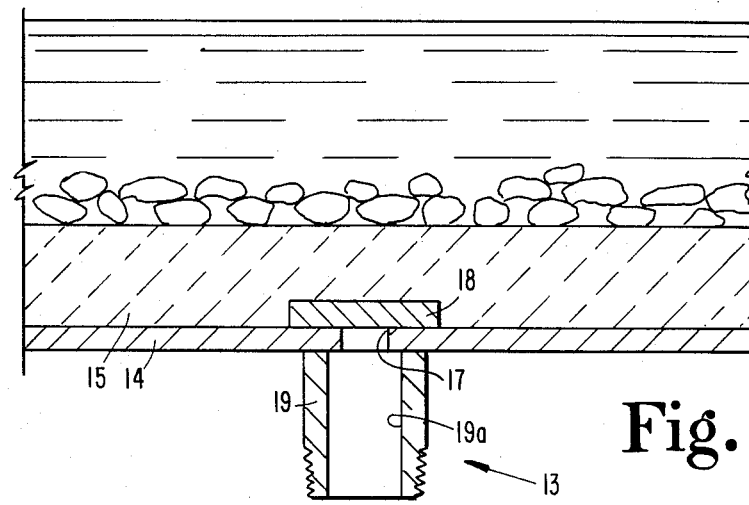
FIG. 3-5 are successive fragmentary section views showing progressive stages of inner lining wear.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows a segment of a piping system in a bulk material handling system. The piping system may be any piping system suited for liquid, pneumatic and/or vacuum transport of highly abrasive bulk materials. While a straight segment of the piping system is shown, it may be understood that the piping system may also have bent, curved and branched sections which together make up the entire bulk material handling system. The system is made up of a number of pipe spools or sections 10 having collared ends 11 and connecting bolt and nut co mbinations 12 for joining respective ends of the pipe sections 10 together in the typical fashion. Each pipe section 10 further includes a plurality of inner lining wear monitors 13 spaced apart along the length of the pipe section and angularly spaced apart about the circumference of the pipe section, the purpose of this construction being made fully apparent later herein.

Referring now also to FIG. 2, each of the pipe sections 10 have an outer casing 14 which is lined along the interior with a highly wear resistant inner lining 15. The outer casing material may be any one of a number of conventionally known and suitably rigid materials such as steel, cast iron, fiberglass, etc. The inner lining material may be any one of a number of wear resistant materials, such as for example ceramic, urethane, rubber, basalt, etc., which meet the needs of the particular application. A first preferred embodiment of the wear monitors 13 of the present invention is shown in cross section. At each location where monitoring of inner lining wear is desired, a hole 17 is provided through the outer casing 14. The hole 17 is sized relative to the size of the particulate material to be conveyed through the pipe system to ensure the hole will not become easily plugged thereby. The inner end of hole 17 is plugged by a cover plate 18 made of a material, such as for example lead or aluminum, which is readily worn away by abrasive contact with the bulk material being conveyed through the pipe section. Cover plate 18 is preferably sized only slightly larger than hole 17. Cover plate 18 is fixedly secured to the inner surface of casing 17 by suitable means, such as for example spot welding.

Figure 6:
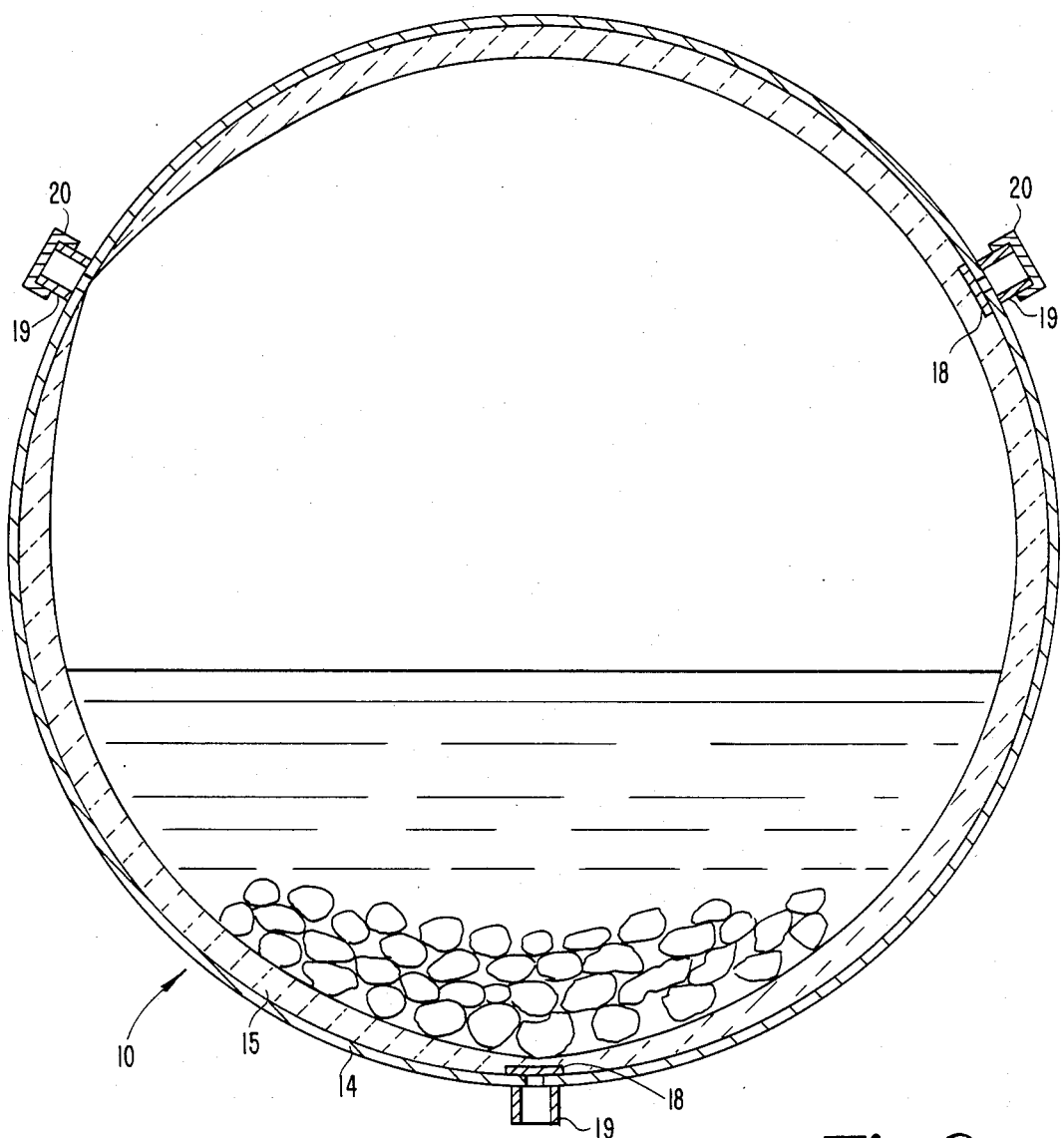
FIG. 6 is a cross section view of a pipe section of the present invention showing it as it might appear in normal service after having been rotated 120° to extend service life.

Each hole 17 communicates with a passageway 19a through a nipple 19 which is fixedly secured to the outer surface of casing 14 by suitable means, such as a weldment. Nipple 19 is provided with external threads so as to threadably receive thereover a cap 20 (FIG. 6).

In order to form a pipe section 10 with the inner lining wear monitors 13 of the type shown in FIG. 2, the procedure is as follows. The casing 14 is formed in any conventional manner. At each location where monitoring of inner lining wear is desired, a hole 17 is drilled through the outer casing 14. Cover plates 18 is fixedly secured over each hole 17 to the inside surface of casing 14. A nipple 19 is then fixedly attached to the outside surface of casing 14 over each hole. The inner lining 15 is then applied within the casing 14.

Figure 4:
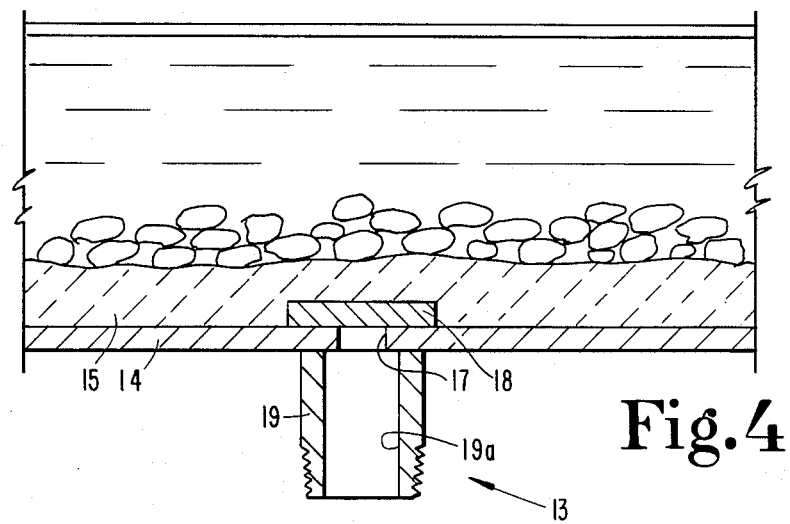
Figure 5:
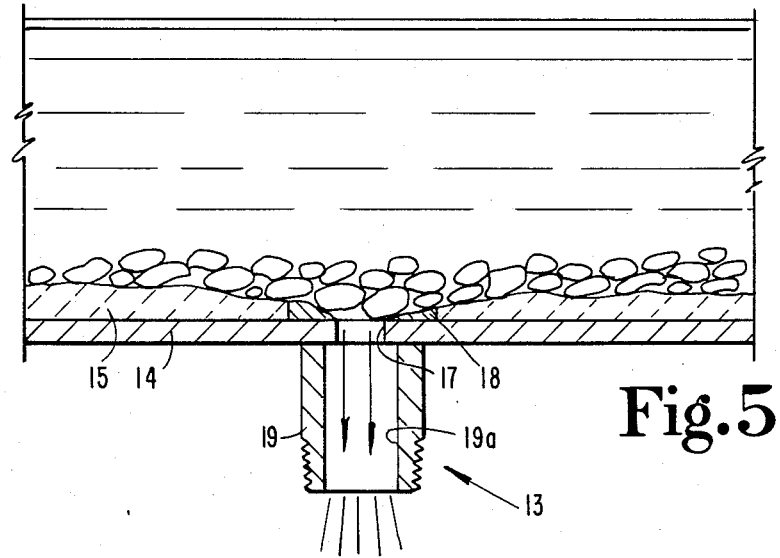

Referring now to FIGS. 3-5, a portion of the inner lining 15 of a pipe section 10 in the area adjacent a wear monitor 13 is shown undergoing successive stages of wear. In FIG. 3, the inner lining 15 has undergone no appreciable wear. In FIG. 4, the inner lining 15 has worn appreciably, but not yet to the point where the cover plate 18 is exposed. Once inner lining wear has progressed to the point where cover plate 18 is exposed, the cover plate readily wears away, creating an opening to hole 17. Once this occurs fluid will flow through hole 17 and outside nipple 19, providing an easily perceived signal to maintenance personnel routinely inspecting external sections of the pipe system for such occurances.

It should be appreciated that the wear monitor 13 has a thickness $t_1$ which correspondingly reduces the thickness of the inner lining 15 in the area of hole 17. Since the cover plate 18 is made of a material which will readily wear away upon being exposed, the wear monitor 13 provides a means for determining when the inner lining 15 has worn to within a desired thickness, approximately equal to $t_1$. In the preferred embodiment depicted in FIG. 2, the thickness $t_1$ is approximately 1/6 the corresponding thickness $t_2$ of the inner lining 15. It should, however, be understood that the invention is not to be restricted to this ratio. The desired ratio between these two thicknesses will vary depending upon a number of variables, such as the relative hardness of the materials selected for the inner lining and cover plate, the rate of wear anticipated, etc. Generally, it may be said that it is of value to have the ratio of $t_1$ to $t_2$ no more than $\frac{1}{2}$ simply to delay the time when one has to perform maintenance on the wear monitor. However, it is also of value to employ a ratio which allows for ease of calculation of the time for scheduling a system shutdown to effect further maintenance.

Referrring now also to FIG. 6, once the maintenance personnel have arrived, the relatively minor flow through the wear monitor may be closed by threadably securing a cap 20 over nipple 19. By checking records indicating when the pipe section was installed or last serviced, maintenance personnel can quickly calculate when further maintenance should be scheduled. For example, if the period since the pipe section was installed is two and one half years and the ratio of $t_1$ to $t_2$ is 1/6, the pipe section should have maintenance scheduled within six months. Since the wear monitor allows the maintenance personnel to schedule servicing before the inner lining 15 is substantially worn through, a further benefit is provided. The pipe section may be rotated on its center line so as to move the worn down area of the pipe section out of line from the high wear area of the pipe, thus allowing the useful life of the pipe to be considerably extended.

As mentioned earlier, it is often not possible to precisely predict where, along the length of a pipe section, the abrasive contact will be most concentrated. This is especially true along the pipe section which is immediately downstream of a curve, bend, or elbow in the pipe system. For this reason, it is desirable to provide a number of wear monitors spaced apart along the length of the pipe section. It is generally known, however, that around a bend or elbow in a pipe section the wear will be most concentrated along the outside center line of the pipe. Further along a straight pipe section, well beyond any curve in the pipe, it can be usually expected that the lowest most point inside the pipe will encounter the most wear. Thus, it is desirable to align the wear monitors angularly relative to the pipe center line so that a line of wear monitors 13 is roughly positioned along the line of increased wear.

In FIG. 6, there are three wear monitors 13 spaced equally apart angularly by 120° about the circumference of the pipe section 10. Of course, the exact number and spacing of the wear monitors 13 will vary depending upon a number of variables, including the shape of the pipe section, expected wear patterns, etc. It is assumed in FIG. 6 that the pipe section is along a straight length of pipe where the greatest wear conditions occur at the bottom of the pipe. Thus, the wear monitors 13 are aligned such that one of them is always aligned with the bottommost portion of the pipe. When this wear monitor is worn through, maintenance personnel will schedule a rotation of the pipe section 120°. FIG. 6 shows the pipe section as it might look after having had one such service rotation in a clockwise direction. Thus, the leftmost wear monitor 13 has been worn through and has been plugged by a cap 20 previously taken from the wear monitor now occupying the position of highest wear. If rotations are properly scheduled, there will be enough remaining inner lining thickness to prevent the casing 14 from wearing through at the low wear positions corresponding to the locations of the upper two wear monitors 13.

Figure 7:
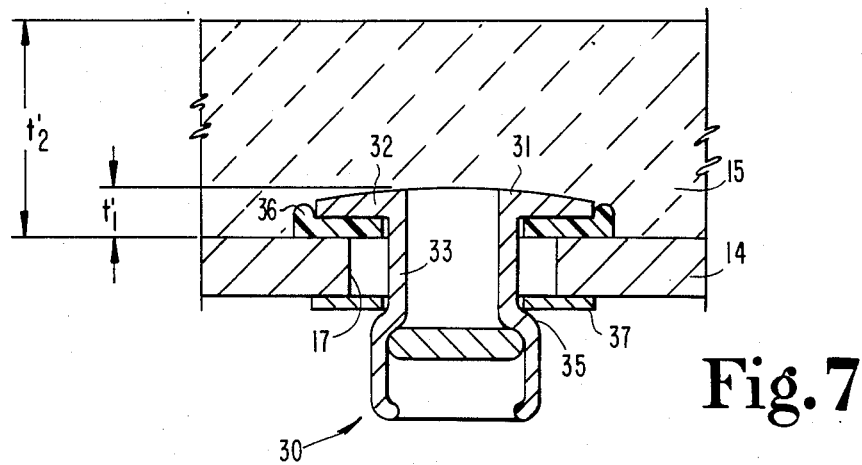
FIG. 7 is a fragmentary cross section view, similar to FIG. 2, but showing a second preferred embodiment of the wear monitor of the present invention.

Referring now to FIG. 7, a second alternative preferred embodiment of the wear monitor of the subject invention is depicted. For convenience, similar reference numerals are used wherever appropriate to describe elements similar to the previous preferred embodiment. In this embodiment, the wear monitor is generally indicated at 30 and includes a pop rivet 31 of well known construction having an integrally formed head 32 and stem 33. Pop rivet 31 is fixedly secured to casing 14 within hole 17 due to the rivet clamping force exerted against casing 14 between between head 32 and shoulder portion 35 of stem 33. Head 32 directly urges against a resilient rubber washer 36 which serves to seal the space between head 32 and casing 14. Shoulder portion 35 directly urges against a metal washer 37 which serves to accommodate for any size difference in the diameter of shoulder portion 35 and the diameter of hole 17. Wear monitor 30 is installed within hole 17 prior to the inner lining 15 being applied to casing 14. The pop rivet 31 is inserted into hole 17 from the inside of casing 14. Metal washer 37 is received over stem 33 and the pop rivet 31 is riveted into place by operation of a rivet gun (not shown) positioned on the inside of casing 14. After all of the wear monitors 30 are installed in their respective holes 17, the inner lining may be applied by any suitable known technique.

Figure 8:
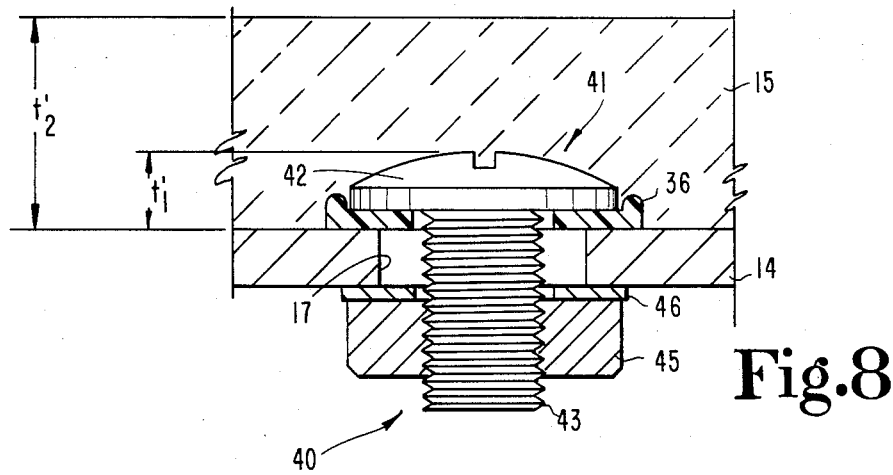
FIG. 8 is a fragmentary cross section view, similar to FIG. 2, but showing a third preferred embodiment of the wear monitor of the present invention.

Referring now to FIG. 8, a third preferred embodiment of the wear monitor of the present invention is depicted. As with the previous preferred embodiment, identical reference numerals are used wherever appropriate to describe elements similar to those in the previous embodiments. In this embodiment, the wear monitor is generally indicated at 40 and includes a threaded screw fastener 41 having an integrally formed head 42 and stem 43. Fastener 41 is fixedly secured to casing 14 within hole 17 due to the clamping force exerted against casing 14 between between head 42 and threaded nut 45. Head 42 directly urges against a resilient rubber washer 36 which serves to seal the space between head 42 and casing 14. A lock washer 46 serves to prevent loosening of the screw and nut combination.

It may be noted that stems 33 and 43 of the second and third preferred embodiments, respectively, are sized sufficiently smaller than the hole 17 such that when the head portion is worn through the stem will be immediately forced out of the hole by the pressure of the fluid.

Figure 9:
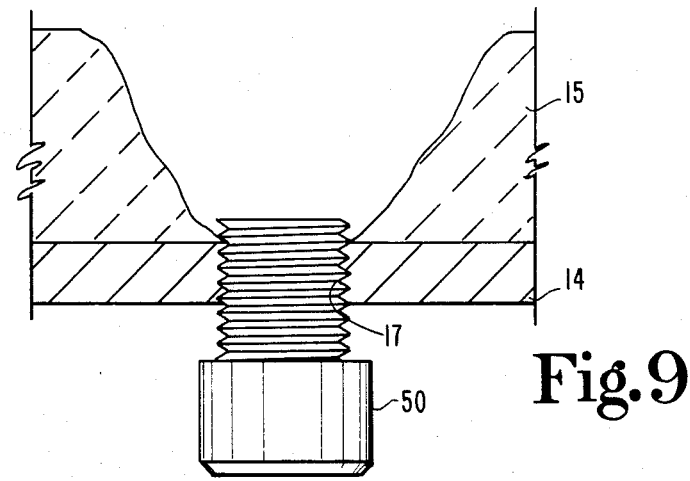
FIG. 9 is a fragmentary view, partially in section, showing a tell-tale hole internally threaded and plugged by a threaded cap.

It may also be perceived that the second and third preferred embodiments of the wear monior, depicted in FIGS. 7 and 8 respectively, do not provide for a means to close off the fluid flow through hole 17 when the wear monitor wears through. Referring to FIG. 9, such means may be provided by internally threading hole 17 and employing a plug 50 having complimentarily sized male threads.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:
    a pipe section for conveying of highly abrasive materials from one location to another, said pipe section having an outer shell and an inner lining, said inner lining made of a material which, relative to said outer shell, is more resistant to wear from abrasive contact with the material conveyed within said pipe section, said outer shell defining a hole therethrough extending between said inner lining and the exterior of said outer shell; and
    a plug member positioned between said inner lining and outer shell and covering the inside facing opening of said hole, said inner lining formed around said plug member and having a thickness which is reduced in the area of said hole by said plug member, said plug member made of a material which, relative to said inner lining material, is readily worn away by abrasive contact with the material conveyed within said pipe section, whereby, when said plug member is worn through, fluid flow is permitted through said hole.

2. The apparatus of claim 1 wherein said plug member integrally includes a head portion and a stem, said head portion covering the inside facing opening of said hole and said stem extending through said hole and sized to be freely slidable therethrough.

3. The apparatus of claim 2 wherein said plug member is a pop rivet.

4. The apparatus of claim 2 wherein said plug member is a headed screw fastener.

5. The apparatus of claim 3 or 4 wherein said apparatus further comprises:

a resilient rubber washer fixed between said head portion and said outer shell and sealing the space therebetween.

6. The apparatus of claim 5 wherein said plug member extends within said inner lining a distance which is less than half the maximum thickness of said inenr lining.

7. The apparatus of claim 1 and further comprising a threaded cap removably attached to said pipe section and arranged to be threadably engaged to said pipe section over said hole on the outside of said outer shell.

8. The apparatus of claim 1 wherein said outer shell defines a plurality of holes equally angularly spaced apart about the circumference of said pipe section and said apparatus further comprises a corresponding plurality of plug members covering each of said holes.

9. The apparatus of claim 8 wherein said inner lining is a ceramic material.

10. In a pipe section having an outer casing and an inner lining which, as compared to said outer casing, is highly resistant to wear from abrasive contact with material conveyed through said pipe section, the improvement comprising:

a tell-tale means for determining when said inner lining has worn to a predetermined thickness of the original thickness of the inner lining, said tell-tale means including said outer casing defining a hole communicating between said inner lining and the exterior of said outer casing, and a plug member located between said inner lining and outer shell and covering the inside facing opening of said hole, said inner lining formed around said plug member, said plug member having a thickness substantially equal to said predetermined thickness, said plug member made of a material which, relative to said inner lining material, is readily worn away by abrasive contact with the material conveyed within said pipe section, whereby, when said plug member is worn through, fluid flow is permitted through said hole.

11. The apparatus of claim 10 wherein said plug member integrally includes a head portion and a stem, said head portion covering the inside facing opening of said hole and said stem extending through said hole and sized to be freely slidable therethrough.

12. The apparatus of claim 11 wherein said plug member is a pop rivet.

13. The apparatus of claim 11 wherein said plug member is a headed screw fastener.

14. The apparatus of claim 12 or 13 wherein said apparatus further comprises:

a resilient rubber washer fixed between said head portion and said outer casing and sealing the space therebetween.

15. The apparatus of claim 14 wherein said plug member extends within said inner lining a distance which is less than half the maximum thickness of said inner lining.

16. The apparatus of claim 10 and further comprising a threaded cap removably attached to said pipe section and arranged to be threadably engaged to said pipe section over said hole on the outside of said outer casing.

17. The apparatus of claim 10 wherein said outer casing defines a plurality of holes equally angularly spaced apart about the circumference of said pipe section and said apparatus further comprises a corresponding plurality of plug members covering each of said holes.

18. The apparatus of claim 17 wherein said inner lining is a ceramic material.

* * * * *